(12) United States Patent
Ysebaert

(10) Patent No.: US 12,550,815 B2
(45) Date of Patent: Feb. 17, 2026

(54) DRIVELINE FOR THE RECIPROCATING KNIVES OF A COMBINE HEADER

(71) Applicant: CNH Industrial America LLC, New Holland, PA (US)

(72) Inventor: Maarten Ysebaert, Tielt (BE)

(73) Assignee: CNH Industrial America LLC, New Holland, PA (US)

( * ) Notice: Subject to any disclaimer, the term of this patent is extended or adjusted under 35 U.S.C. 154(b) by 542 days.

(21) Appl. No.: 18/098,362

(22) Filed: Jan. 18, 2023

(65) Prior Publication Data

US 2023/0225242 A1     Jul. 20, 2023

(30) Foreign Application Priority Data

Jan. 20, 2022  (EP) ..................................... 22152509

(51) Int. Cl.
*A01D 34/30* (2006.01)
*A01D 34/32* (2006.01)
(Continued)

(52) U.S. Cl.
CPC ............. *A01D 34/32* (2013.01); *A01D 34/30* (2013.01); *A01D 41/142* (2013.01); *A01D 34/14* (2013.01); *A01D 69/06* (2013.01)

(58) Field of Classification Search
CPC ...... A01D 34/00–34/905; A01D 41/00–41/16; A01D 69/00–69/12;
(Continued)

(56) References Cited

U.S. PATENT DOCUMENTS

| 3,729,907 A | 5/1973 | Burrough et al. |
| 4,127,981 A | 12/1978 | Parrish et al. |

(Continued)

FOREIGN PATENT DOCUMENTS

| EP | 2700293 | 2/2014 |
| EP | 2700294 | 2/2014 |

(Continued)

OTHER PUBLICATIONS

EP Application No. 22152509, European Search Report, dated Oct. 11, 2022, 10 pgs.

*Primary Examiner* — Joseph M Rocca
*Assistant Examiner* — Madeline I Runco
(74) *Attorney, Agent, or Firm* — Fletcher Yoder, P.C.

(57) ABSTRACT

A combine header includes a header frame and a set of reciprocating knives. The combine header includes a driveline for driving reciprocating movement of the knives, the driveline including a transverse drive shaft, a bevel gearbox, a lateral drive shaft, and a transmission near the knives. The lateral drive shaft is coupled respectively to the bevel gearbox and the transmission by first and second universal joints. An inlet axle of the transmission is integral with or fixed to a flywheel configured to stabilize rotation of the lateral drive shaft. The second universal joint includes two orthogonal forks coupled by a cross-piece. One of the forks is integral with or fixed to a flange that is attached to a surface of the flywheel that faces the lateral drive shaft. The flange is configured to contribute to the stabilizing function of the flywheel when the flange is attached to the surface.

11 Claims, 6 Drawing Sheets

(51) Int. Cl.
*A01D 41/14* (2006.01)
*A01D 34/14* (2006.01)
*A01D 69/06* (2006.01)

(58) Field of Classification Search
CPC ...... A01D 34/32; A01D 34/30; A01D 41/142; A01D 34/14; A01D 69/06
See application file for complete search history.

(56) References Cited

U.S. PATENT DOCUMENTS

| | | | |
|---|---|---|---|
| 7,886,512 B2* | 2/2011 | Lohrentz | A01D 57/20 56/181 |
| 2005/0086919 A1 | 4/2005 | Stiefvater et al. | |
| 2012/0317951 A1 | 12/2012 | Vereecke et al. | |
| 2016/0033009 A1* | 2/2016 | Gil | A01D 41/142 74/390 |
| 2016/0044870 A1 | 2/2016 | Mayerle | |
| 2022/0053694 A1* | 2/2022 | De Lathauwer | A01D 41/16 |

FOREIGN PATENT DOCUMENTS

| | | | | |
|---|---|---|---|---|
| EP | 2700294 A2 * | 2/2014 | ............. | A01D 34/30 |
| EP | 2921041 A1 * | 9/2015 | ............. | A01D 34/30 |
| EP | 3669633 | 6/2020 | | |

* cited by examiner

DRIVELINE FOR THE RECIPROCATING KNIVES OF A COMBINE HEADER

CROSS-REFERENCE TO RELATED APPLICATION

This application claims priority from European Patent Application Serial No. EP 22152509, entitled "A DRIVELINE FOR THE RECIPROCATING KNIVES OF A COMBINE HEADER", filed Jan. 20, 2022, which is hereby incorporated by reference in its entirety.

FIELD OF THE INVENTION

The present invention is related to self-propelled combine harvesters, in particular to a driveline that connects a power shaft of the harvester to a set of reciprocating knives of a combine header coupled at the front of the harvester.

STATE OF THE ART

A combine harvester includes a main self-propelled body mounted on four wheels and comprising an engine to drive the self-propelled movement of the harvester, and further comprising a feeder at the front of the harvester, a threshing system, a cleaning arrangement, a grain tank and a crop residue spreading apparatus. A removable header is attached at the front of the harvester, the header comprising movable knives at the front of a header table, a reel for guiding crops towards the knives, and transportation means such as an auger or a set of draper belts, to move the cut crops towards the centre of the header where the crops enter the feeder.

The knives of the header are part of a single or double cutterbar, that further comprises stationary counterknives, wherein the movable knives undergo a reciprocating movement or a continuous movement relative to the counterknives, thereby cutting the crops at a given height above ground level.

The movement of a set of reciprocating knives is typically driven by a driveline that is coupled to a power shaft of the harvester, and that comprises a laterally placed gearbox near the back side of the header and a transmission near the front side of the header, where a rotating part of the transmission is converted into a reciprocating motion. In traditional harvester designs, the transmission may be a belt or chain transmission, and the conversion may be realized by a wobble box.

Alternative configurations have been developed, as illustrated for example in patent publication documents EP2700293A2 and EP2700294A2 wherein the driveline comprises a bevel gearbox, a telescopic rotatable shaft coupled at one end to the output axle of the gearbox, and a planetary gearbox coupled to the other end of the telescopic shaft. The telescopic shaft takes the place of the belt drive of the more traditional configuration, and the planetary gearbox takes the place of the wobble box. The fact that the shaft is telescopic enables moving the cutterbar forward and backward for varying the length of the header table.

In the configurations described in EP2700293A2 and EP2700294A2, the joint that couples the telescopic shaft to the planetary gearbox is mounted inside a cup-shaped flywheel that is integral with the input axle of the planetary gearbox. This makes this joint however very difficult to access. Also, the flywheel can be rather heavy on larger machines, which can make it difficult to handle the flywheel during installation or maintenance.

SUMMARY OF THE INVENTION

The invention aims to solve the above-described problems and achieves this aim by a header comprising a driveline arrangement as described in the appended claims. The present invention is thus related to a combine header comprising a header frame and a set of knives at the front of the header configured to undergo a reciprocating transverse movement, i.e. transverse with respect to the forward direction of travel of the harvester when the header is coupled thereto. The header comprises a driveline for driving said reciprocating movement, the driveline including a transverse drive shaft at the back of the header frame, a bevel gearbox, a lateral drive shaft and a transmission in the vicinity of the knives and configured to directly drive the knife motion. The lateral drive shaft is coupled respectively to the bevel gearbox and the transmission by a first and second universal joint. The inlet axle of the transmission is integral with or fixed to a flywheel configured to stabilize the rotation of the lateral drive shaft. The second universal joint comprises two orthogonal forks coupled by a cross-piece. One of the forks is integral with or fixed to a flange that is attached to a surface of the flywheel that faces the lateral drive shaft. The flange is configured to contribute to the stabilizing function of the flywheel when the flange is attached to said surface In other words, the assembly of the flywheel and the flange forms an enlarged operational flywheel. Due to its function, the flywheel is an axisymmetric body with respect to the flywheel's rotation axis. As the flange contributes to the stabilizing function, the flange is also an axisymmetric body about said rotation axis. The flange may for example be bolted to the surface of the flywheel that faces the lateral drive shaft.

The attachment of the universal joint to the flywheel by way of the flange enables easy access to the universal joint as well as providing a construction wherein the weight of the flange contributes to the weight of the flywheel when the driveline is operational.

According to an embodiment, the flywheel has a base portion and an axisymmetric sidewall that is oriented towards the lateral drive shaft and/or towards the transmission. According to a preferred embodiment, the flywheel comprises a sidewall oriented towards the lateral drive shaft so as to form a cup-shaped interior space and the flange is a ring-shaped flange attached to the top surface of said sidewall, with the second universal joint at least partially located inside said cup-shaped inner space. Such a configuration is particularly advantageous in the case of a header provided with an extendable and retractable header table.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

Figure 1:
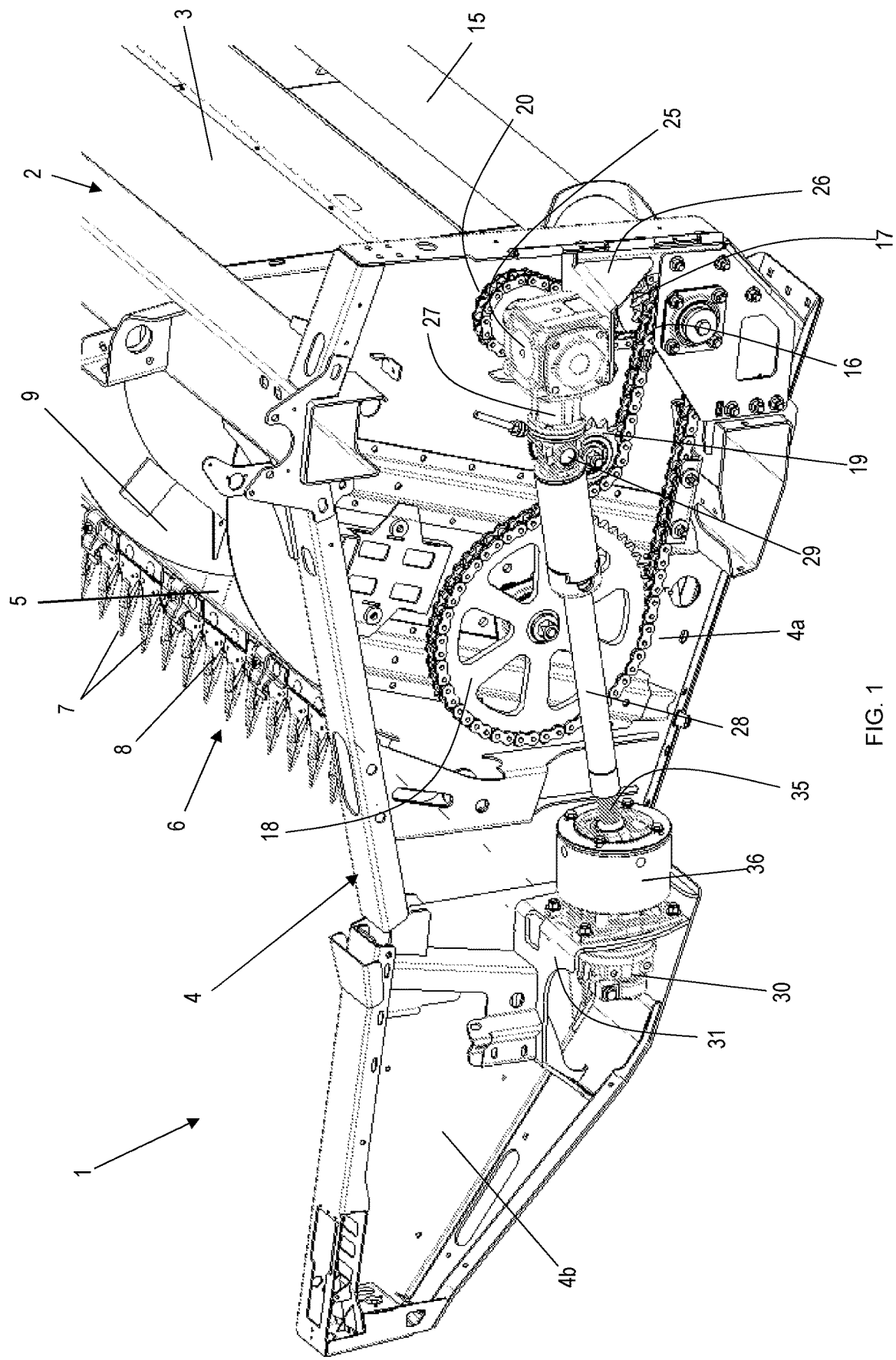
FIG. 1 illustrates a driveline for driving the reciprocating movement of the knives of a cutterbar in a header according to a first embodiment of the invention.

FIG. 1 illustrates a combine header 1 according to one exemplary embodiment of the invention. The construction of a combine header is well-known and the header is therefore not shown in its entirety. The header comprises a frame 2 having a back wall 3 and two side walls 4, only one of which is shown in the image. The floor of the header is formed by an extendable and retractable header table 5, at the front of which is mounted a cutterbar 6 comprising a row of stationary counterknives 7 and a set of movable cutter knives 8 configured to undergo a reciprocating movement relative to the counterknives 7. The extension or retraction of the header table 5 (and thereby the cutterbar 6) relative to the frame 2 may be actuated by multiple variable length actuators mounted underneath the header table 5 and not visible in the drawing, but known as such. The side wall 4 has a rear portion 4a that is part of the header frame 2, and a front portion 4b that is integral with or fixed to the header table 5 so as to extend or retract together with said table 5 relative to the frame 2.

A rotatable auger 9 is visible as well, configured to move crops towards the centre of the header 1, where the crops enter the feeder section (not shown) of the harvester. A second auger with oppositely inclined auger blades is present on the other side (not shown) of the header 1.

The driveline for driving the reciprocating movement of the knives 8 is now described in more detail. The terms 'inlet axle' and 'outlet axle' are defined within the present context as respective axles of gearboxes or other types of transmissions which are part of the driveline. The wording 'inlet' and 'outlet' are to be understood as referring to the direction of the power transfer along the driveline, starting at the back of the header where power is taken up from a power source, towards the front of the header, where power is consumed by the movement of the knives.

The driveline comprises a transverse drive shaft 15 mounted at the back of the header 1. This shaft 15 is referred to as transverse in the sense that it is oriented transversally with respect to the header's forward direction of travel through a field of crops when the header 1 is mounted at the front of an operational combine harvester. The transverse shaft 15 is coupled at its first end (not shown) to a power shaft of the combine. At its second end, the transverse shaft 15 comprises a pair of sprockets 16 and 17, which are the driving sprockets of a first and second chain drive. The first chain drive is configured to drive the rotation of the auger 9, through a larger sprocket 18 coupled to the auger's rotation axle. The first chain drive further comprises a tensioning sprocket 19. The first chain drive is not in fact part of the driveline for driving the knife movement, but it is driven by the same transverse shaft 15. The auger 9 could be driven in another way, for example by a driveline that is completely separate from the knife movement's driveline.

The second chain drive comprises besides the sprocket 17, a further sprocket 20 located above said sprocket 17. Said upper sprocket 20 is coupled to the inlet axle of a bevel gearbox 25 mounted on a support bracket 26 that is fixed to the frame 2. The bevel gearbox 25 comprises said inlet axle (not visible) and an outlet axle 27, coupled to the first end of a lateral drive shaft 28 by a first universal joint 29. The drive shaft 28 is termed 'lateral' in the sense that it is located at the side of the header frame 2 and oriented from the back area of the header 1 towards the front area of the header 1, i.e. in the general direction of the header's forward movement through a field when it is coupled to an operational harvester.

The driveline for the knife movement may comprise further universal joints or other couplings upstream of the components described so far, i.e. between a power shaft of the harvester and the bevel gearbox 25. Such upstream joints and couplings are not shown in detail and are not the subject of the present invention. In fact, this upstream part of the driveline may be in accordance with any currently known driveline design. Also the bevel gearbox 25 itself is a component that is known per se, and any suitable type of known bevel gearbox may be applied in the driveline of the invention, comprising a set of bevel gears configured to transform the rotation about a first axis to a rotation about a second axis oriented essentially perpendicularly to the first axis. According to alternative embodiments of the invention, the bevel gearbox 25 is coupled directly to the transverse drive shaft 15 instead of being coupled thereto via the chain drive comprising the sprockets 17 and 20.

In the embodiment shown, the lateral drive shaft 28 is a telescopic drive shaft that can extend or retract in length when the header table 5 is extended or retracted. Such a telescopic drive shaft is known as such and any known type of telescopic drive shaft can be implemented in a header according to embodiments of the invention that include an extendable and retractable header table. The invention is however not limited to a header comprising an extendable header table, but applies also to header having a fixed header table. In that case, the lateral drive shaft 28 can be a standard (i.e. non-telescopic) drive shaft.

As stated, the first end of the lateral drive shaft 28 is coupled to the outlet axle 27 of the bevel gearbox 25 via the first universal joint 29. The second end of the lateral drive shaft 28 is coupled to the inlet axle (not visible in FIG. 1) of a planetary gearbox 30 mounted on a support bracket 31 in the vicinity of the cutterbar 6, via a second universal joint 35. The support bracket 31 is part of the extendable front portion 4b of the header sidewall 4. The planetary gearbox 30 comprises an outlet axle (not visible) that is coupled to the knives 8 in order to actuate the reciprocating movement of the knives. The planetary gearbox 30 as such and the way in which it is coupled to the knives 8 may be in accordance with known configurations, and these aspects are therefore not described here in detail.

As seen in FIG. 1 and as will be shown in more detail later, a flywheel 36 is fixed to or integral with the inlet axle of the planetary gearbox 30. The second universal joint 35 and the way in which it is coupled to the flywheel 36 forms the main focus of the present invention. A more detailed image of the second joint 35 and the manner in which it is coupled to the planetary gearbox 30 according to one particular embodiment is illustrated in the section view shown in FIG. 2. In this section view, the internal rotatable components of the planetary gearbox 30 are not shown, and only the housing 30a of said gearbox is visible, as well as the bolts 37 by which this housing 30a is attached to the bracket 31 (not shown in FIG. 2). The flywheel 36 comprises a hollow central axle 38 configured to receive therein the inlet axle (not shown in FIG. 2) of the planetary gearbox 30. Said inlet axle is fixed to the central axle 38 and thereby to the flywheel 36 as such. The flywheel 36 itself comprises a base portion 36a with the hollow axle 38 in the centre thereof, a sidewall comprising a first sidewall portion 36b rising up perpendicularly with respect to the base portion 36a in the general direction of the lateral drive shaft 28 and a second sidewall portion 36c oriented in the direction of the planetary gearbox 30. For the sake of brevity, the first and second sidewall 'portions' 36b and 36c are hereafter referred to as first and second 'sidewalls' of the flywheel 36. The flywheel's function is to stabilize the rotation of one or more rotating components of the driveline, in particular the lateral drive shaft 28. Due to this stabilizing function, the flywheel 36 is an axisymmetric body with respect to its rotation axis 36d.

The base portion 36a and the first sidewall 36b are forming a cup shape with the base portion 36a defining the bottom of the cup and the first sidewall 36b defining the interior space of the cup. Side openings 39 are provided in the sidewall 36b, for the supply of lubricant to the interior of the cup shape. The second sidewall 36c forms an oppositely oriented cup shape. However in this particular embodiment, the second sidewall 36c is optional and could be omitted.

Figure 2:
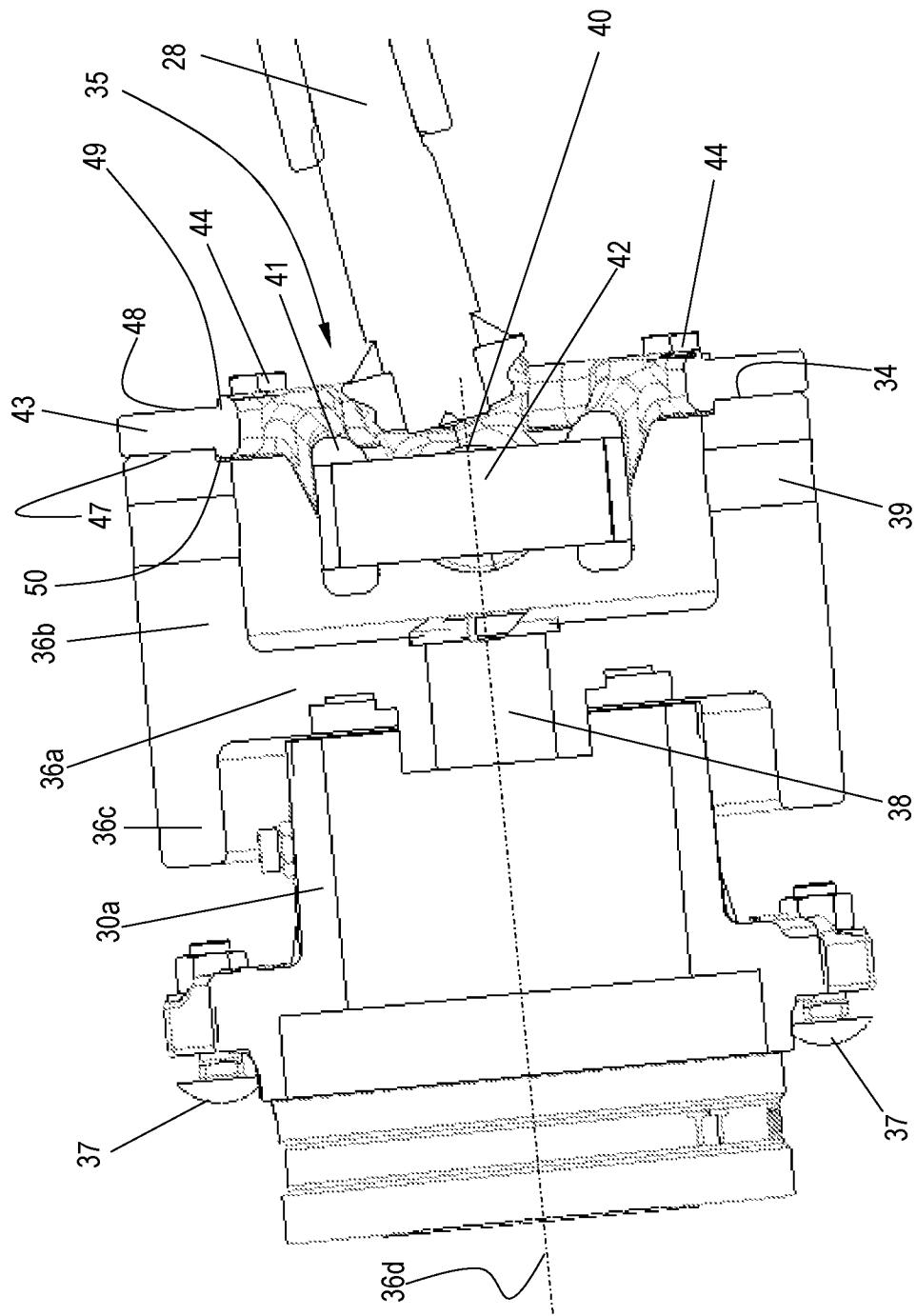
FIG. 2 is a section view of a characteristic portion of the driveline shown in FIG. 1.
Figure 3:
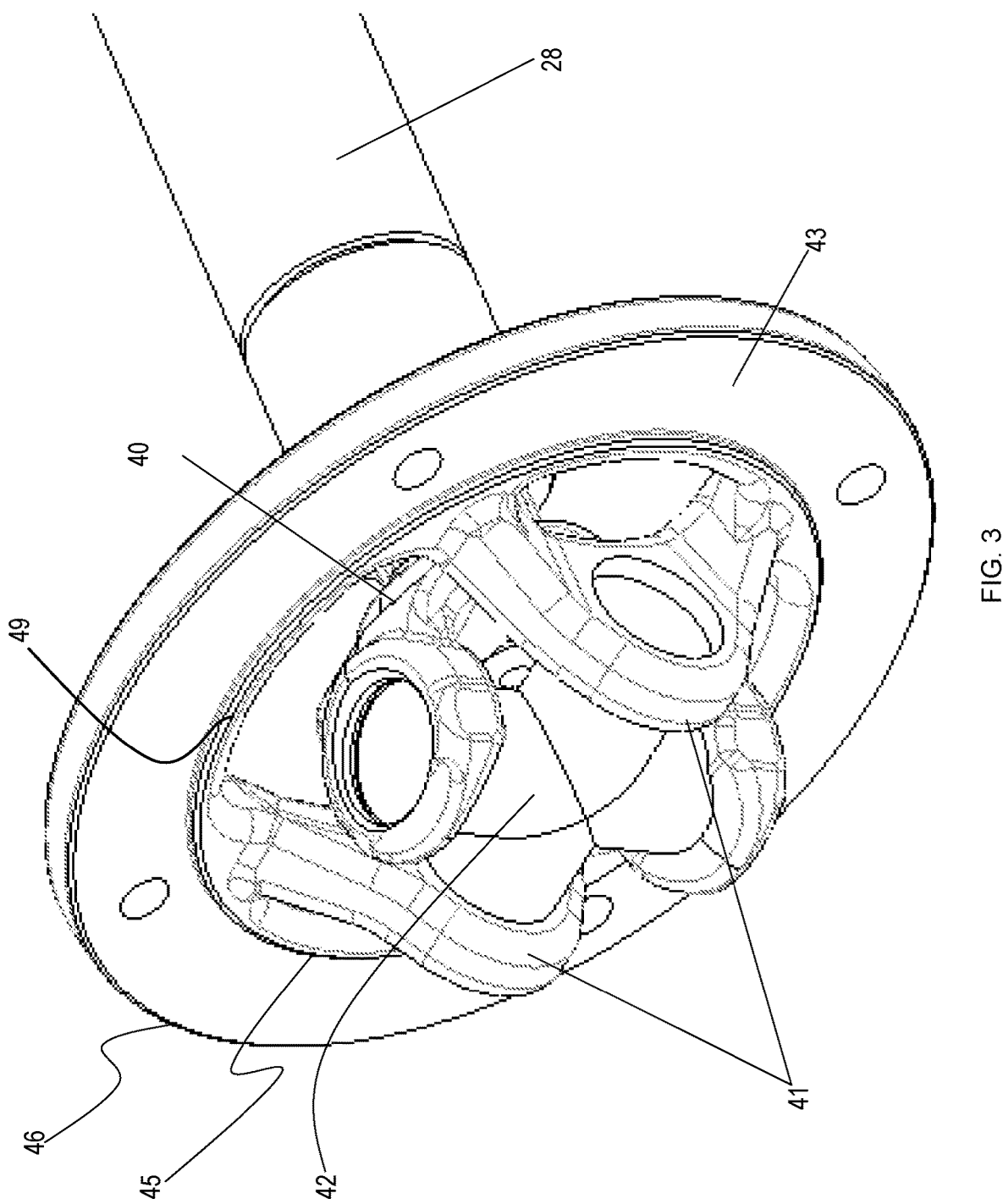
FIG. 3 is a detail of one of the universal joints in the driveline of FIG. 1.

With reference to both FIGS. 2 and 3, it is seen that the second universal joint 35 comprises a first fork 40 and a second fork 41, which are interconnected by a cross-shaped centre piece 42 and with the second fork 41 oriented at a right angle to the first fork 40, the forks being pivotably coupled to the respective legs of the centre piece 42. These elements are known elements of any universal joint. In the joint shown in FIGS. 2 and 3 however, the second fork 41 is integral with a ring-shaped flange 43 that is removably fixed to the top surface 34 of the sidewall 36b of the flywheel 36. In the particular case of the embodiment shown, the flange 43 is mounted flush against the top surface 34 of the sidewall 36b and secured thereto by screw connections 44.

Figure 4B:
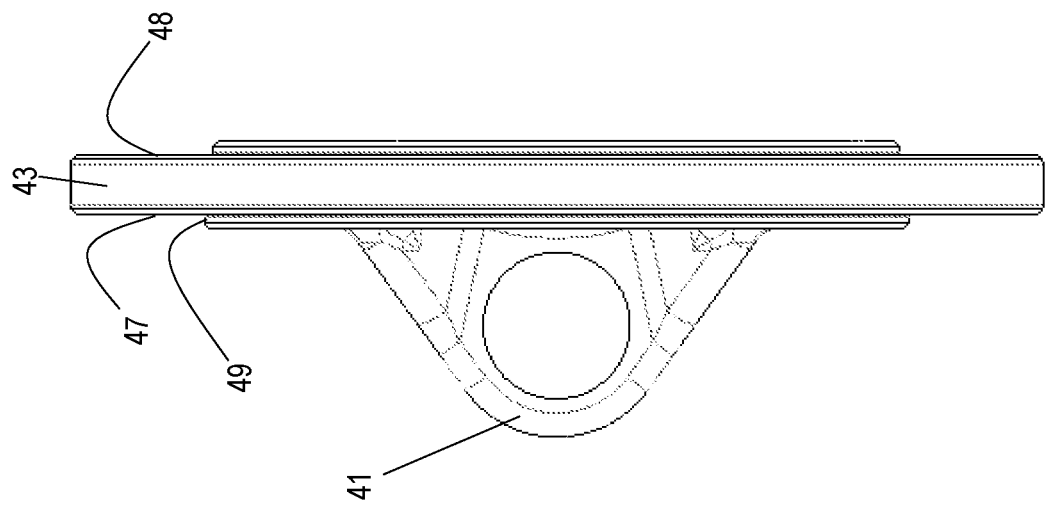
FIGS. 4a and 4b are images of the ring-shaped flange that is integral with one fork of the universal joint shown in FIG. 3.
Figure 4A:
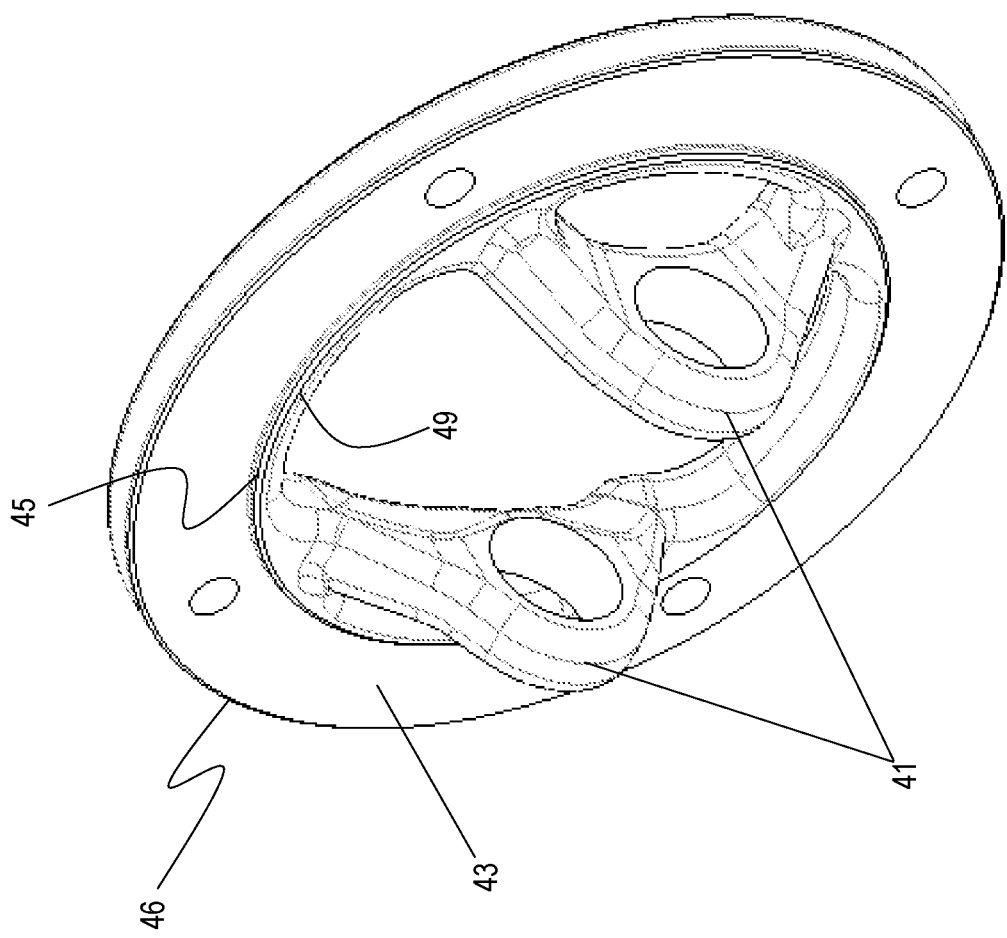

In FIGS. 4a and 4b, the piece comprising the flange 43 and the second fork 41 of the universal joint 35 is shown in more detail. The flange has an inner circular circumference 45 and an outer circular circumference 46. It is seen that the legs of the fork 41 are attached to the flange 43 in the vicinity of the inner circumference 45. With reference to FIGS. 2 and 4b, it is seen that the flange 43 has a first side plane 47 facing the flywheel 36 and a second side plane 48 facing the lateral drive shaft 28. The fork 41 protrudes outward from the first side plane 47, so that the joint 35 is essentially located inside the interior space of the cup defined by the base portion 36a and the sidewall 36b. It is to be understood that although in the embodiment shown, the second fork 41 is integral with the flange 43, this flange itself is not a part of the universal joint 35. The flange 43 further comprises a rim portion 49 along the inner circumference, which fits into a recess 50 along the inner circumference of the top of the sidewall 36b and that is helpful for aligning the flange 43 to the top surface 34 of the sidewall 36b. Said rim portion 49 is however optional and could be omitted.

The piece shown in FIGS. 4a and 4b comprising both the flange 43 and the second fork 41 is preferably produced as an integrally cast or forged piece, but could also be obtained by producing the legs of the fork 41 and attaching them to the ring-shaped flange 43 by welding.

The configuration described so far has a number of advantages over the prior art. Through the flange 43, the universal joint 35 is coupled to the top surface 34 of the flywheel's sidewall 36b and not to the base portion 36a of the flywheel, which facilitates removal and re-mounting operations performed during maintenance or repair, as the connection between the joint 35 and the flywheel 36 is more easily accessible. In addition, the weight of the flange 43 is added to the weight of the flywheel 36, i.e. the 'operational' flywheel is mainly formed of the assembly of the flywheel 36 and the flange 43. As a consequence, the dimensions of the flywheel 36 as such can be reduced without diminishing its stabilizing effect. The specific embodiment wherein the joint 35 (comprising the forks 40 and 41 but not the flange 43) is mounted inside the flywheel 36 is moreover advantageous in that it maximizes the distance between the first and second joints 29 and 35. This is particularly useful in the case of the header 1 shown in the drawings, i.e. a header provided with an extendable and retractable header table 5. In this header type, it is important to obtain the highest possible extension length for a given header size. The higher the distance between the joints 29 and 35, the higher the obtainable extension length without requiring more complex and expensive measures such as the use of a three-piece telescopic shaft or a header design with longer sidewalls 4.

Figure 5:
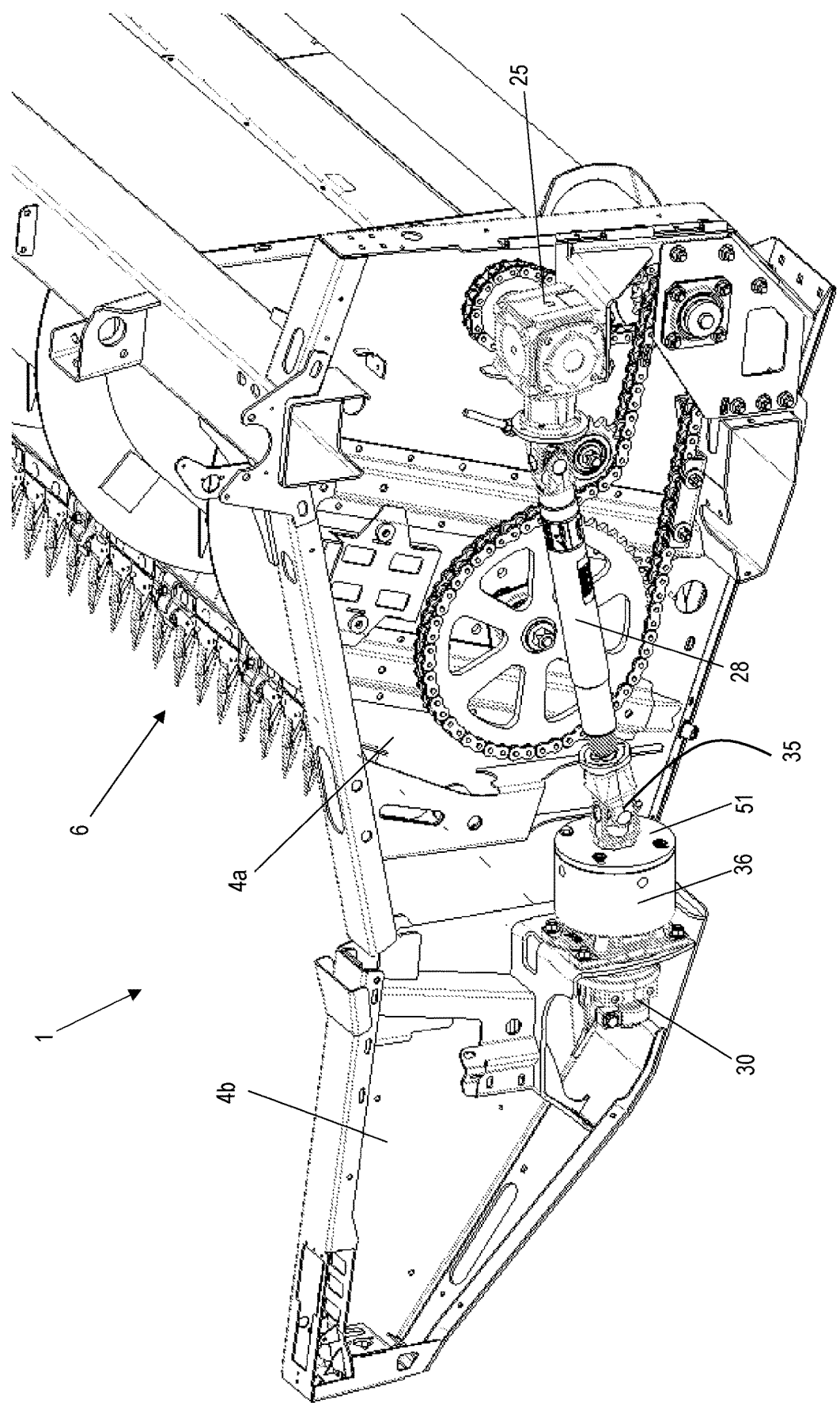
FIG. 5 illustrates a driveline for driving the reciprocating movement of the knives of a cutterbar in a header according to a second embodiment of the invention.
Figure 6:
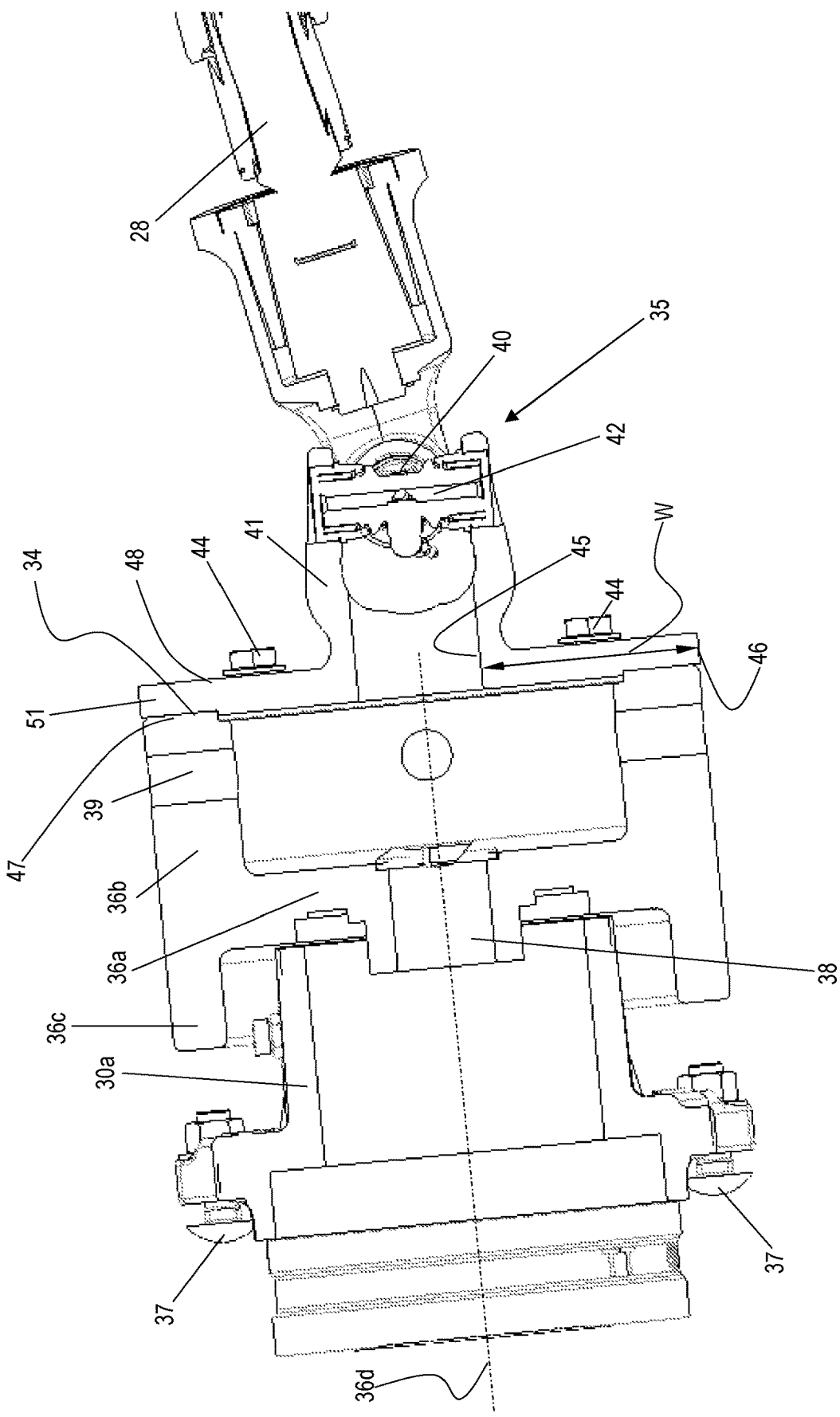
FIG. 6 is a section view of a characteristic portion of the driveline shown in FIG. 5.

Nevertheless, the invention is not limited to the case where the joint 35 is located inside the cup-shape defined by the base portion 36a and the sidewall 36b of the flywheel 36. The first two advantages, i.e. easy accessibility and reduction of the flywheel weight, are also obtained by a second embodiment illustrated in FIGS. 5 and 6, wherein the second joint 35 is located outside and adjacent to the flywheel 36, while still being coupled to a ring-shaped flange 51 that is bolted to the top surface 34 of the flywheel's sidewall 36b. As seen in FIG. 6, the second fork 41 of the joint is again integral with the flange 51 and attached to said flange 51 in the vicinity of the inner circumference 45. The width W between the inner and outer circumferences 45 and 46 of the flange 51 is however larger in this case, as the first fork 40 is not required to enter into the interior of the cup-shape defined by the base portion 36a and the sidewall 36b of the flywheel 36.

An equivalent to the configuration shown in FIG. 6 may include a closed disc-shaped flange instead of a ring-shaped flange, with the second fork 41 integral with or attached to the centre of the disc.

According to a variant of the embodiments wherein the universal joint 35 is adjacent the flywheel, the flywheel comprises only the base portion 36a and the second sidewall 36c, and the flange 51 or a closed disc-shaped flange is attached to the base portion 36a, at the side opposite the sidewall 36c.

In fact, the invention is not limited to a flywheel having either a single or double cup shape. In general terms, the flange 43 or 51 (or a closed disc-shape flange) is removably attached to a surface of the flywheel that faces the lateral drive shaft 28. When the flange is a closed disc, the flywheel could even be a solid axisymmetric body.

A number of variations of the above-described embodiments are possible without departing from the scope of the independent claims.

The planetary gearbox 30 is just one example of a transmission that can be applied in a header according to the invention, and that is capable of transforming the rotation of the lateral drive shaft 28 into a reciprocating movement of the knives 8. Another transmission that can be used in a header according to the invention is a wobble box.

The outer diameter of the flange 43 or 51 could be somewhat larger than the outer diameter of the flywheel 36 so that the outer circumference of the flange extends beyond the diameter of the flywheel 36. Alternatively, the outer diameter of the flange 43 or 51 could be somewhat smaller than the outer diameter of the flywheel 36, and the top surface 34 of the flywheel's sidewall 36b could be provided with a rim portion so that the flange 43 or 51 may be fitted into said rim portion for easy alignment of the flange to the flywheel.

The flange 43 or 51 is preferably directly attached to the surface 34 of the flywheel facing the lateral drive shaft 28, i.e. lying flush against and in contact with said surface 34, as illustrated in the drawings. There could however be an intermediate ring or an additional flange or a number of spacers in between the flange 43 or 51 and the surface 34 of the flywheel.

The flange 43 or 51 could be part of a larger piece that is attached to the flywheel 36, such as for example a cup-shaped piece of which the flange 43 or 51 is the bottom portion and further comprising a sidewall that is placed over the flywheel 36, for example overlapping the flywheel's sidewall 36b. Such a cup-shaped piece could then be attached to the flywheel by bolt connections through the flange 43 or 51 and/or by bolt connections through the overlapping sidewalls.

In the embodiment of FIGS. 1 to 4, the second universal joint 35 is preferably fully located inside the interior space of the cup-shape formed by the base portion 36a and the sidewall 36b of the flywheel, but the joint 35 could also be partially located in said interior space, if the fork 41 protrudes outward from the side plane 47 over a smaller distance than shown in the drawings, or if one or more spacers are added between the flange 43 and the top surface 34 of the flywheel's sidewall 36b.

In a header according to the invention, any of the embodiments described above can be present on both sides of header 1, when the header is provided with a double cutterbar, i.e. a set of knives 8 on each side, the two sets spanning the complete width of the header 1, each set of knives being actuated by respective drivelines arranged laterally on the two sides of the header. In this case, the inventive aspects described above are applicable to the driveline of each of the knife sets.

A combine harvester of the invention is equipped with a header comprising a single or double driveline in accordance with any of the above-described embodiments or their equivalents. The header is operationally coupled to the harvester, meaning that the transverse drive shaft 15 is rotatably coupled to a power shaft of the harvester, so that the driveline is powered by a power source of the harvester.

The invention claimed is:

1. A combine header comprising a header frame and a driveline configured to drive a reciprocating movement of a set of knives mounted at a front of the combine header, the driveline comprising:
   a transverse drive shaft at a back of the combine header;
   a bevel gearbox having an inlet axle that is coupled to the transverse drive shaft, and an outlet axle;
   a lateral drive shaft arranged laterally with respect to the header frame, the lateral drive shaft having a first end and a second end; and
   a transmission having an inlet axle and an outlet axle, the outlet axle being coupled to the set of knives;
   wherein:
      the lateral drive shaft is coupled at its first end to the outlet axle of the bevel gearbox via a first universal joint;
      the lateral drive shaft is coupled at its second end to the inlet axle of the transmission via a second universal joint;
      the driveline comprises a flywheel that is integral with or fixed to the inlet axle of the transmission, the flywheel being configured to perform a stabilizing function to stabilize rotation of the lateral drive shaft;
      the second universal joint comprises a first fork attached to the lateral drive shaft, a second fork oriented orthogonally with respect to the first fork and attached to the inlet axle of the transmission and a cross-piece, wherein the first and second forks are pivotable relative to legs of the cross-piece;
      the second fork is integral with or fixed to a flange that is removably attached to a surface of the flywheel that faces the lateral drive shaft; and
      the flange is configured to contribute to the stabilizing function of the flywheel when the flange is attached to the surface.

2. The combine header according to claim 1, wherein the flywheel comprises a base portion and a sidewall, the base portion being integral with or fixed to the inlet axle of the transmission, and the sidewall being oriented, starting from the base portion, toward the lateral drive shaft, toward the transmission, or a combination thereof.

3. The combine header according to claim 2, wherein:
   at least a portion of the sidewall is oriented toward the lateral drive shaft, so as to form a cup, with the base portion defining a bottom of the cup, and the portion of the sidewall defining an interior space of the cup;
   the flange is shaped as a planar ring having a first side plane facing the flywheel and attached to the surface of the portion of the sidewall oriented toward the lateral drive shaft, and a second side plane facing the lateral drive shaft;
   legs of the second fork are attached to the flange and protrude outward from the first or second side plane of the flange.

4. The combine header according to claim 3, wherein the legs of the second fork of the second universal joint protrude outward from the first side plane in a direction of the interior space of the cup, so that the second universal joint is at least partially mounted inside the interior space.

5. The combine header according to claim 3, wherein the legs of the second fork of the second universal joint protrude outward from the second side plane in a direction of the lateral drive shaft, so that the second universal joint is mounted adjacent the flywheel.

6. The combine header according to claim 1, wherein the flange is shaped as a disc, and the second fork of the second universal joint is attached to the disc on a side of the lateral drive shaft, so that the second universal joint is mounted adjacent the flywheel.

7. The combine header according to claim 1, wherein the knives are part of a cutter bar mounted at a front of an extendable and retractable header table, and the lateral drive shaft is a telescopic drive shaft.

8. The combine header according to claim 1, wherein the transmission is a planetary gearbox.

9. The combine header according to claim 1, wherein the transmission is a wobble box.

10. The combine header according to claim 1, comprising a belt or chain drive that couples the transverse drive shaft to the inlet axle of the bevel gearbox.

11. A combine harvester comprising the combine header according to claim 1.

* * * * *